US012459665B2

(12) United States Patent
Averkova et al.

(10) Patent No.: US 12,459,665 B2
(45) Date of Patent: Nov. 4, 2025

(54) CONTEXT-AWARE INTEGRATED ELECTRONIC CHECKLIST

(71) Applicant: HONEYWELL INTERNATIONAL INC., Charlotte, NC (US)

(72) Inventors: Dariia Averkova, Phoenix, AZ (US); Nichola Lubold, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 150 days.

(21) Appl. No.: 18/363,495

(22) Filed: Aug. 1, 2023

(65) Prior Publication Data

US 2025/0042571 A1 Feb. 6, 2025

(51) Int. Cl.
*B64D 45/00* (2006.01)
*G06F 3/0482* (2013.01)
*G06F 3/0483* (2013.01)
*G06F 3/0485* (2022.01)
*G06F 9/451* (2018.01)

(52) U.S. Cl.
CPC ........... *B64D 45/00* (2013.01); *G06F 3/0482* (2013.01); *G06F 3/0483* (2013.01); *G06F 3/0485* (2013.01); *G06F 9/452* (2018.02); *G06F 2203/04803* (2013.01)

(58) Field of Classification Search
CPC ....... B64D 45/00; G06F 9/452; G06F 3/0482; G06F 3/0483; G06F 3/0485; G06F 2203/04803
See application file for complete search history.

(56) References Cited

U.S. PATENT DOCUMENTS

| | | | |
|---|---|---|---|
| 5,522,026 A | 5/1996 | Records et al. | |
| 6,262,720 B1 * | 7/2001 | Jeffrey | G05B 23/0272 715/202 |
| 6,542,796 B1 | 4/2003 | Gibbs et al. | |
| 9,171,273 B2 | 10/2015 | Thomas | |
| 9,569,323 B1 * | 2/2017 | Gershzohn | G06F 11/32 |
| 9,889,946 B2 | 2/2018 | Slocum et al. | |
| 10,099,801 B2 | 10/2018 | Thomas | |
| 11,155,361 B2 | 10/2021 | Conaway | |
| 2012/0209468 A1 * | 8/2012 | Thomas | G07C 5/006 701/32.4 |
| 2017/0275017 A1 | 9/2017 | Slocum et al. | |
| 2020/0122855 A1 * | 4/2020 | Conaway | B64D 43/00 |
| 2020/0168104 A1 * | 5/2020 | Holder | G08G 5/55 |
| 2020/0346783 A1 | 11/2020 | Conaway et al. | |

(Continued)

Primary Examiner — Stephen S Hong
Assistant Examiner — Darrin Hope
(74) Attorney, Agent, or Firm — Ingrassia Fisher & Lorenz, LLP

(57) ABSTRACT

An electronic checklist (ECL) system is disclosed. The ECL is configured to: generate an ECL display window, the ECL display window including an checklist information display panel and a checklist item display panel, the checklist information display panel having an annotations area and a virtual pilot area; populate the checklist item display panel with a plurality of checklist items from the ECL, wherein the checklist item display panel is scrollable to display checklist items from the ECL that occur earlier or later than a checklist item that is in focus; automatically populate the annotations area with information relating to a checklist item that is active; and cause the ECL display window to be displayed on the display device.

20 Claims, 13 Drawing Sheets

(56) References Cited

U.S. PATENT DOCUMENTS

| | | | |
|---|---|---|---|
| 2021/0192411 A1* | 6/2021 | Conaway | G06F 16/2291 |
| 2022/0009650 A1 | 1/2022 | Ping | |
| 2022/0084517 A1* | 3/2022 | Garg | G08G 5/21 |
| 2022/0119126 A1* | 4/2022 | Anthony | G08G 5/53 |
| 2022/0397918 A1* | 12/2022 | Krenz | G08G 5/21 |

* cited by examiner

CONTEXT-AWARE INTEGRATED ELECTRONIC CHECKLIST

TECHNICAL FIELD

The technology described in this patent document relates generally to aviation checklists and more particularly to electronic checklists.

BACKGROUND

Checklists are used in aerial vehicles to make missions safer. Checklists provide an air crew with a way to check and validate that the aerial vehicle is in a proper configuration for a given phase of flight and provide steps for resolving problems that may occur during flight. While vital to safe operations, checklist execution can be a labor-intense task, especially in off-nominal situations, which require the pilot to read, look up references, deliberate, and execute steps, all while also flying the aerial vehicle.

A checklist may be provided on paper, as a digitized version of the paper version often in the form of PDFs, or as an electronic checklist (ECL). ECL systems can help pilots more effectively complete checklist actions than paper versions or digitized versions of the paper version. For example, ECL systems can offer feedback loops where a checklist item can be automatically marked as complete upon flight crew action if a corresponding system sends feedback to the checklist system. ECL systems, however, can be improved in many respects.

Accordingly, it is desirable to provide an improved ECL system. Furthermore, other desirable features and characteristics of the present invention will become apparent from the subsequent detailed description of the invention and the appended claims, taken in conjunction with the accompanying drawings and the background of the invention.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In some aspects, the techniques described herein relate to a system in an aerial vehicle for providing an intelligent electronic checklist (ECL), the system including: a display device; and a controller including one or more processors and non-transitory computer readable media encoded with programming instructions, the controller configured to: receive aircraft data from one or more avionics systems; select, based on the aircraft data, an appropriate ECL; generate an ECL display window, the ECL display window including an checklist information display panel and a checklist item display panel, the checklist information display panel having an annotations area (e.g., an area for checklist notes, cautions and warnings) and a virtual pilot area; populate the checklist item display panel with a plurality of checklist items from the ECL, wherein the checklist item display panel is scrollable to display checklist items from the ECL that occur earlier or later than a checklist item that is in focus; automatically populate the annotations area with information relating to a checklist item that is active; and cause the ECL display window to be displayed on the display device.

In some aspects, the techniques described herein relate to a method in an aerial vehicle for providing an intelligent electronic checklist (ECL), the system including: receiving aircraft data from one or more avionics systems; selecting, based on the aircraft data, an appropriate ECL; generating an ECL display window, the ECL display window including an checklist information display panel and a checklist item display panel, the checklist information display panel having an annotations area (e.g., an area for checklist notes, cautions and warnings) and a virtual pilot area; populating the checklist item display panel with a plurality of checklist items from the ECL, wherein the checklist item display panel is scrollable to display checklist items from the ECL that occur earlier or later than a checklist item that is in focus; automatically populating the annotations area with information relating to a checklist item that is active; and displaying the ECL display window on a display device.

In some aspects, the techniques described herein relate to an intelligent electronic checklist (ECL) system including: a controller including one or more processors and non-transitory computer readable media encoded with programming instructions, the controller configured to: receive aircraft data from one or more avionics systems; select, based on the aircraft data, an appropriate ECL; generate an ECL display window, the ECL display window including an checklist information display panel and a checklist item display panel, the checklist information display panel having an annotations area (e.g., an area for checklist notes, cautions and warnings) and a virtual pilot area; populate the checklist item display panel with a plurality of checklist items from the ECL, wherein the checklist item display panel is scrollable to display checklist items from the ECL that occur earlier or later than a checklist item that is in focus; automatically populate the Annotations area with information relating to a checklist item that is active; and cause the ECL display window to be displayed on the display device.

Furthermore, other desirable features and characteristics will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

The subject matter described herein discloses a dynamic, context-aware, and integrated Electronic Checklist System (ECL system) that can support single pilot and two-men crew by automatically and intelligently integrating information from different sources, optimizing information presentation, reducing the load on a flight crew member's working memory, and reducing overall workload by aiding in pilot decision-making with intelligent support, among other features. The apparatus, systems, techniques, and articles provided herein disclose novel ways of interacting with checklists that supports reduced crew and single pilot operations, harnessing the potential of ECLs.

The subject matter described herein discloses apparatus, systems, techniques, and articles that redistribute checklist tasks normally done by a 2-man crew between a single pilot and a virtual copilot. The subject matter described herein discloses apparatus, systems, techniques, and articles that enable an intuitive grasp of the automation occurring. The subject matter described herein discloses apparatus, systems, techniques, and articles that optimize information presentation. The subject matter described herein discloses apparatus, systems, techniques, and articles that provide automatic and intelligent integration of information from different sources. The subject matter described herein discloses apparatus, systems, techniques, and articles that optimize checklist navigation. The subject matter described herein discloses apparatus, systems, techniques, and articles that allow for multimodal inputs (e.g., CCD, touch, speech). The subject matter described herein discloses apparatus, systems, techniques, and articles that enable quick and decisive action by the pilot.

Figure 1:
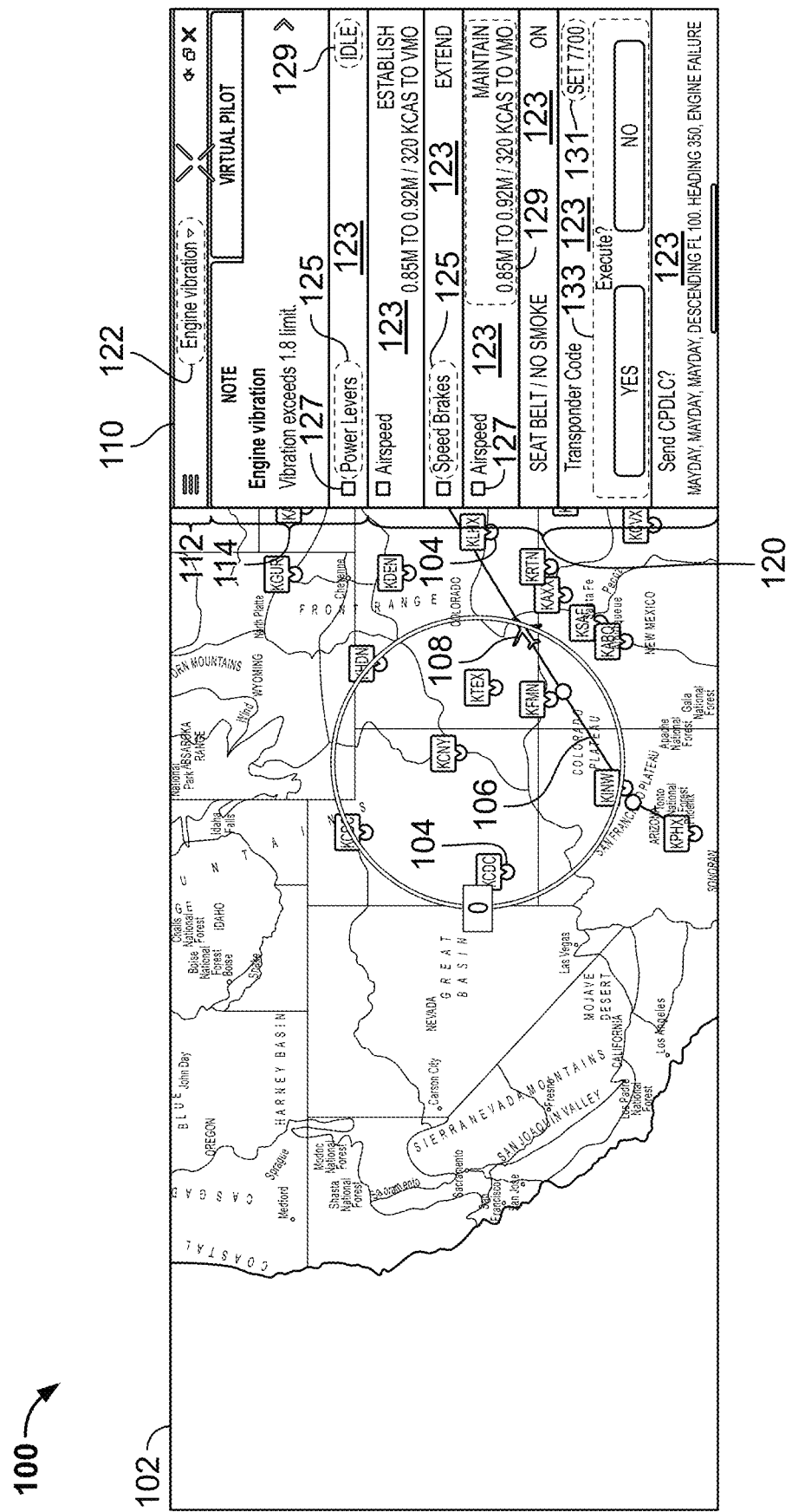
FIG. 1 is a diagram depicting an example aircraft display in an aircraft that includes the display of an electronic checklist (ECL), in accordance with various embodiments.

FIG. 1 is a diagram depicting an example aircraft display 100 in an aircraft that includes the display of an electronic checklist (ECL), in accordance with various embodiments. The example aircraft display 100 includes a map 102 of an area surrounding an aircraft flight path. The example aircraft display 100 also includes a computer-generated ECL display window 110 that is overlaid over the map 102. The example ECL display window 110 includes a header panel 112, a checklist information display panel 114 with an annotations area 116 (e.g., a first tab) and a virtual pilot area 118 (e.g., a second tab), and a checklist item display panel 120. The example header panel 112 includes an indicator 122 (e.g., textual indicator) of a reason for the ECL.

The example checklist item display panel 120 includes a plurality of checklist item widgets 123. Each checklist item widget 123 corresponds to a checklist item in the ECL. The example checklist item display panel 120 is scrollable to display checklist item widgets 123 for checklist items from the ECL that occur earlier or later than the checklist items corresponding to the checklist item widgets 123 that are on display. Each checklist item widget 123 includes an ID field 125 that identifies the checklist item corresponding to the checklist item widget 123. Various checklist item widgets 123 include a checkbox widget 127 for identifying whether tasks relating to the checklist item that corresponds to the checklist item widget have been completed. Various checklist item widgets 123 also include a status field 129 for providing aircraft system status information that is relevant to completing a checklist item represented by a checklist item widget 123. Various checklist item widgets 123 include an action widget 131 for identifying a proposed action to be performed to satisfy the checklist item corresponding to the checklist item widget 123. Various checklist item widgets 123 include a verification widget 133 for user use in verifying whether a proposed action is approved for performance.

Figure 2:
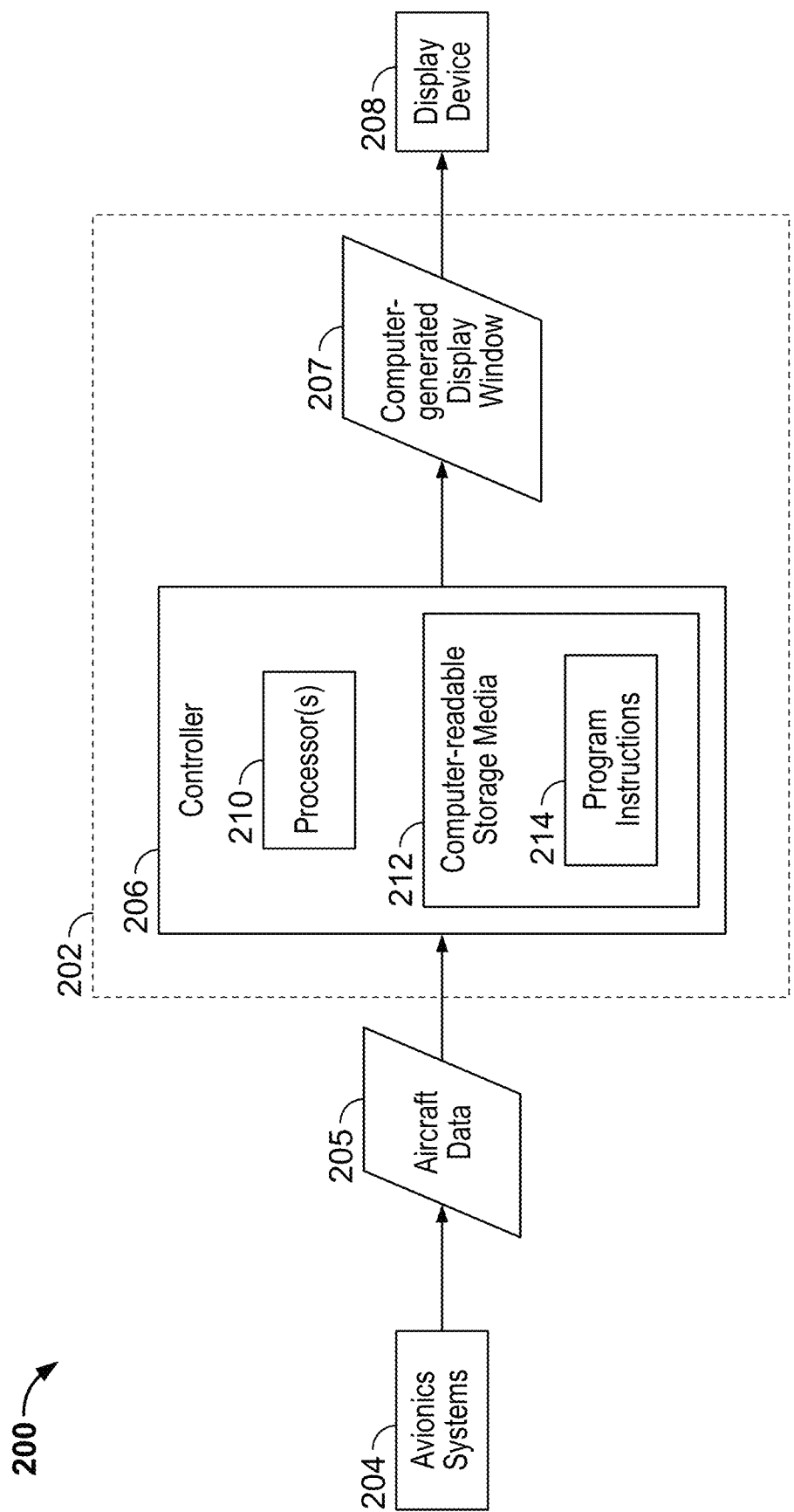
FIG. 2 is a block diagram depicting an example system in an aerial vehicle for displaying an electronic checklist, in accordance with various embodiments.

FIG. 2 is a block diagram depicting an example system 200 in an aerial vehicle for displaying an electronic checklist (ECL), in accordance with various embodiments. The example system 200 includes an ECL generation system 202 and avionics systems 204 (e.g., flight management system, engine indicating and crew alerting system, inertial navigation system, data transfer system, and others) that generate aircraft data 205 (e.g., speed, altitude, engines status, flight path information, alerts, and more) that can be used by the ECL generation system 202 to determine when a checklist needs to be performed.

The example ECL generation system 202 includes a controller 206 that is configured to generate a computer-generated display window 207 for display on a display device 208 (e.g., multi-function display, navigational display, or other) on the aerial vehicle. The controller 206 includes at least one processor 210 and computer-readable storage device or media 212 encoded with programming instructions 214 for configuring the controller 206. The processor 210 may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media 212 may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller 206.

The example controller 206 is configured by the programming instructions 214 on the non-transitory computer readable media 212 to generate the computer-generated display window 207, which includes an ECL, such as computer-generated ECL display window 110. In various embodiments, the example controller 206 is configured by the programming instructions 214 on the non-transitory computer readable media 212 to receive aircraft data 205 from one or more avionics systems 204; detect, based on the aircraft data 205, a condition for which an ECL is applicable; generate an ECL display window (e.g., computer-generated ECL display window 110), wherein the display window includes a header panel (e.g., header panel 112), a checklist information display panel (e.g., checklist information display panel 114), and a checklist item display panel (e.g., checklist item display panel 120). In various embodiments, the checklist information display panel has an annotations area (e.g., annotations area 116) and a virtual pilot area (e.g., virtual pilot area 118).

In various embodiments, the example controller 206 is configured to populate the header panel (e.g., header panel 112) with an indicator (e.g., ID field 125) of a reason for the ECL; and populate the checklist item display panel (e.g., checklist item display panel 120) with a plurality of checklist items from the ECL, wherein the checklist item display panel is scrollable to display checklist items from the ECL that occur earlier or later than a checklist item that is in focus. In various embodiments, the checklist item display panel includes an expansion widget associated with an expandable checklist item that is selectable to cause the checklist item display panel to be populated with a plurality of checklist items from a nested ECL that is dependent on the expandable checklist item.

In various embodiments, the example controller 206 is configured to populate the checklist information display panel (e.g., checklist information display panel 114) with information relating to a checklist item that is active (e.g., in focus) when the annotations area is active. In various embodiments, the example controller 206 is configured to populate the checklist information display panel (e.g., checklist information display panel 114) with an explanation for the active branch of the checklist or a description of an action taken by the ECL generation system 202 that is related to a checklist item that is active when the virtual pilot area is active. In various embodiments, the example controller 206 is configured to cause the ECL display window 207 (e.g., computer-generated ECL display window 110) to be displayed on the display device.

Figure 3A:
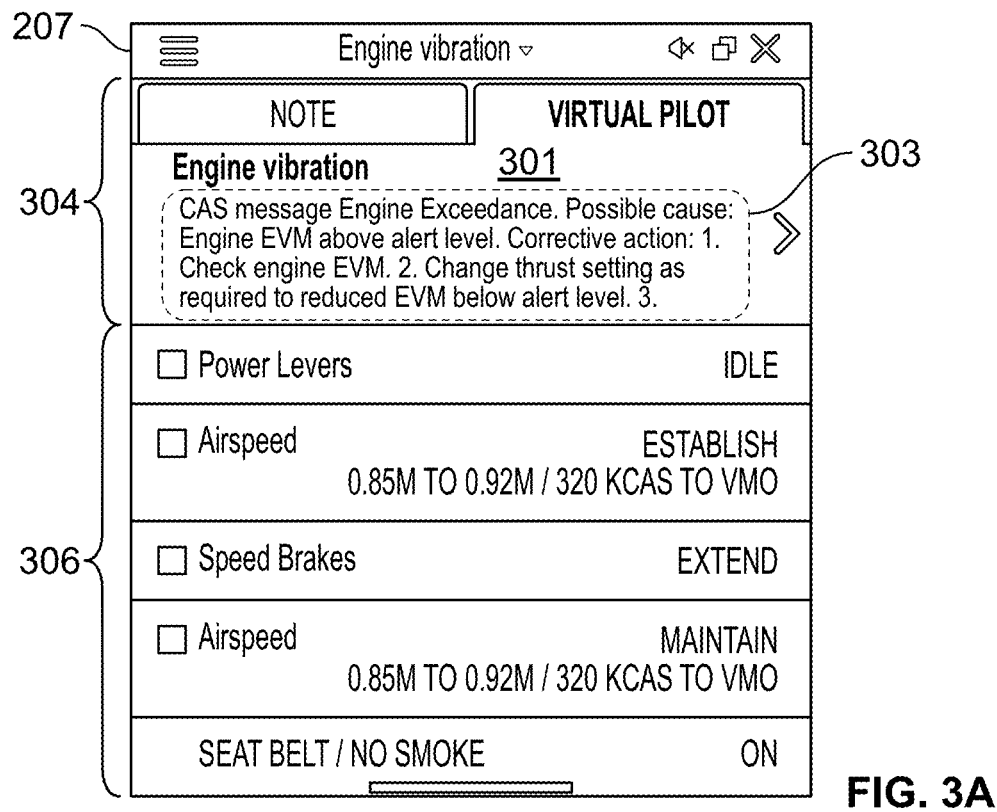
FIGS. 3A-3P are diagrams depicting example screenshots of an ECL display window illustrating various features provided in an ECL, in accordance with various embodiments.
Figure 3B:
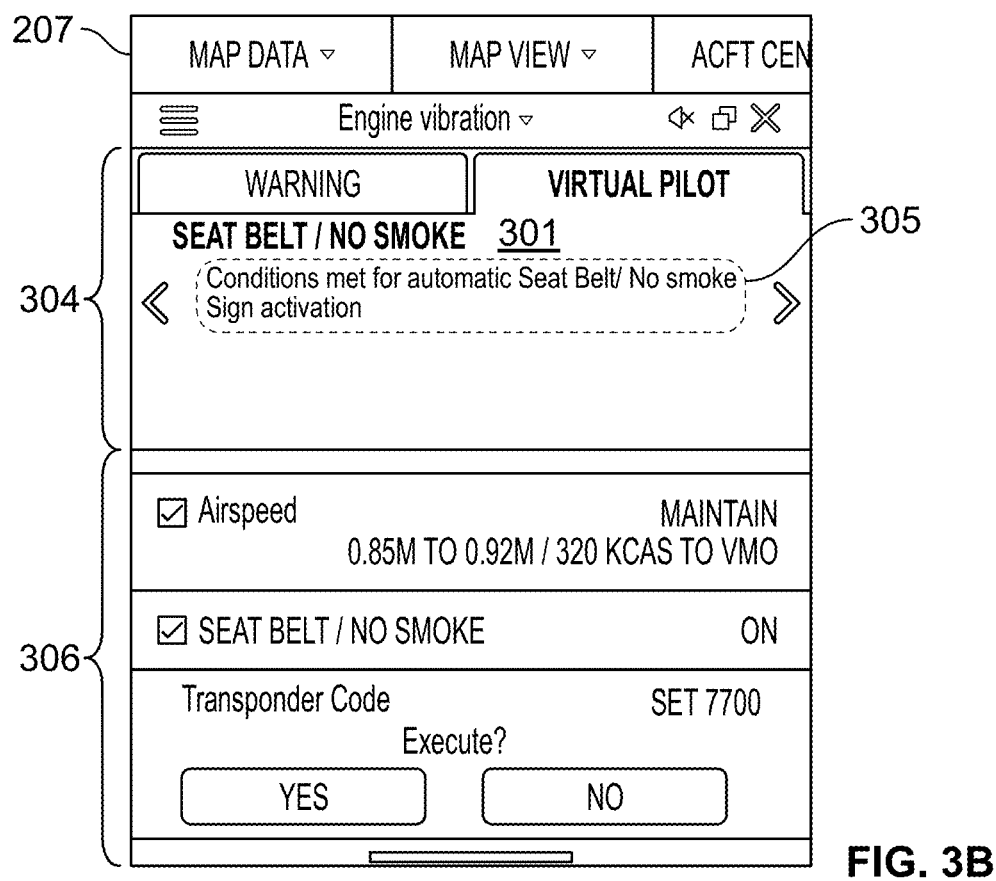

Referring to the examples of FIGS. 3A and 3B, which illustrates embodiments of a Virtual pilot feature in an example ECL, a dedicated Virtual pilot area 301 is provided in an checklist information display panel 304 of an example ECL display window 207. The Virtual pilot area 301 is displayed in a top area of the ECL display window 207 relative to the displayed checklist items which are displayed in a checklist item display panel 306. In the example of FIG. 3A, the Virtual pilot area 301 provides an explanation 303 for the active branch of the checklist. In the example of FIG. 3B, the Virtual pilot area 301 provides an explanation 305 for a selected automated step.

The example ECL generation system 202 can be configured to implement many different features in an ECL via the ECL display window 207. The features can be implemented independently or may be combined in an ECL. The features may include one or more of enhanced checklist navigation and interaction features, context-aware and dynamic checklist features, and integrated, intelligent and explainable checklist features. The features are described in connection with FIGS. 3A-3P, wherein FIGS. 3A-3P are diagrams depicting example screenshots of an ECL display window illustrating various features provided in an ECL via the ECL display window 207 by an example ECL generation system 202.

The enhanced checklist navigation and interaction features provided by the example ECL generation system 202 can empower the ECL to effectively present information and allow more flexibility to a flight crew regarding how checklist items are executed. In various embodiments, enhanced checklist navigation and interaction features include providing a dedicated Annotations area (e.g., annotations area 116 in a checklist information display panel 114). In many paper checklists notes, cautions, and warnings (referred to herein as "Annotations") are positioned next to the checklist items to which they pertain. The example ECL generation system 202 provides an ECL wherein the Annotations appear in the dedicated Annotations area (e.g., annotations area 116 in an checklist information display panel 114), which in some embodiments may always be displayed in a top area of the ECL display window 207 relative to the displayed checklist items (e.g., displayed in the checklist item display panel 120). Each Annotation is unequivocally associated with a related checklist item and the ECL display window 207 is configured to display the Annotations that are associated with a checklist item that is in focus.

One checklist step may have several associated annotations and the ECL display window 207 is configured to clearly indicate when a checklist step has several associated annotations. In various embodiments, the ECL display window 207 clearly indicates when a checklist step has several associated annotations by displaying a graphical element such as a slider widget or navigation arrow widgets that provide a way to navigate between the various Annotations that are associated with the checklist item. In various embodiments, the ECL display window 207 provides for automatic transition to a new annotation (when the associated ECL item becomes active or in focus). In various embodiments, the ECL display window 207 provides a current annotation or annotations (if there are several annotations for one checklist item) in a visually different format from old annotations. For example, if no new annotation is relevant to a newly transitioned to checklist item, the annotations area may continue to display the old annotation that is not relevant to the active checklist item but in a different color or shade from an annotation that is relevant to an active checklist item.

Figure 3C:
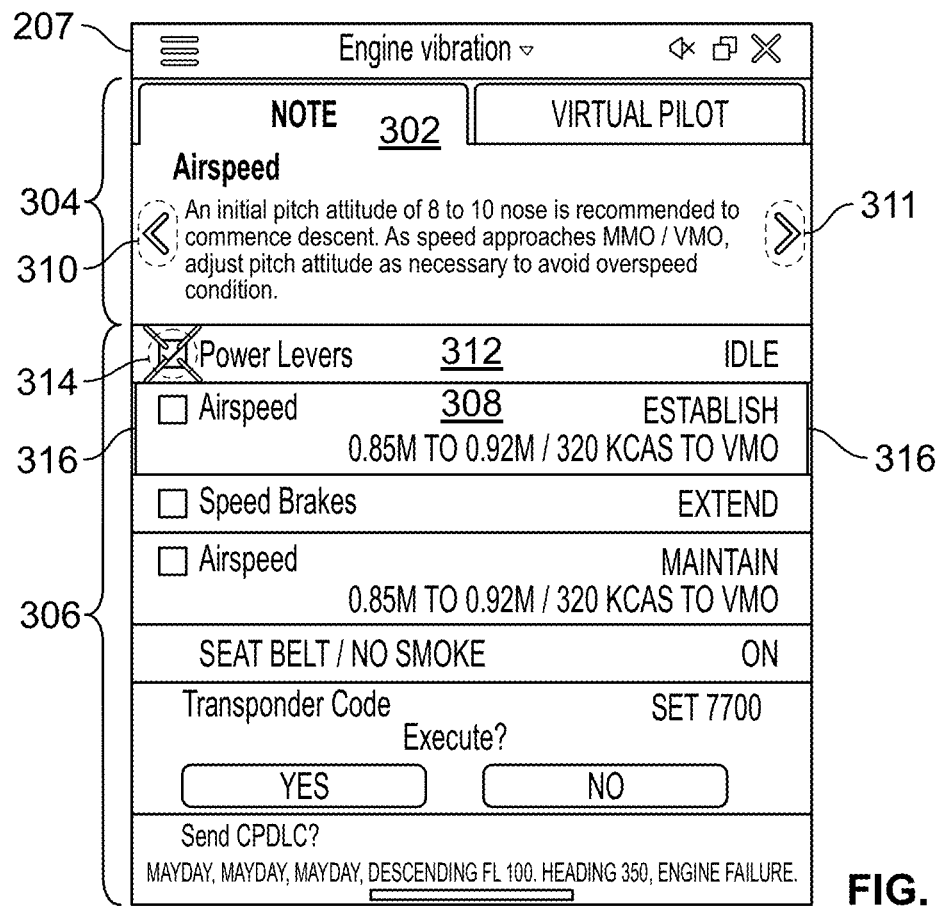

Referring to the example of FIG. 3C, which illustrates an embodiment of a Annotations feature in an example ECL, a dedicated Annotations area 302 is provided in a checklist information display panel 304 of an example ECL display window 207. The dedicated Annotations area 302 is displayed in a top area of the ECL display window 207 relative to the displayed checklist items which are displayed in a checklist item display panel 306. The ECL display window 207 is configured to display the annotations that are associated with a checklist item 308 that is active or in focus. In this example, the checklist item 308 has several associated annotations and the ECL display window 207 clearly indicates that the checklist item 308 has several associated annotations by displaying navigation arrow widgets 310, 311 that when selected navigate between the various annotations that are associated with the checklist item 308. The example ECL display window 207 also indicates that: a prior checklist item 312 has been completed via a check in a checkbox widget 314, automatic transition to checklist item 308 has occurred as indicated by the focus indicators 316, and automatic transition to an annotation has occurred.

In various embodiments, the enhanced checklist navigation and interaction features also include a vertical nesting feature. The vertical nesting feature allows a nested (child) checklist to be opened within the current (parent) checklist, thus creating a seamless checklist. The vertical nesting feature is enabled by an interactive nesting widget that upon actuation (e.g., click/touch) allows a nested checklist to expand (e.g., drop down), so that items of a child checklist are inserted into the parent checklist. In various embodiments, the graphical implementation of the vertical nesting feature clearly shows where the insertion of the nested (child) checklist is made, and which items belong to the parent and nested checklists. Scrolling up and down the checklist will allow a user to view the steps from the parent checklist. The interactive nesting widget is also configured to cause the nested checklist to collapse (e.g., close) on actuation to reduce visual clutter. In various embodiments, a clear indication regarding whether a nested checklist has been started but not completed and collapsed is provided.

Figure 3D:
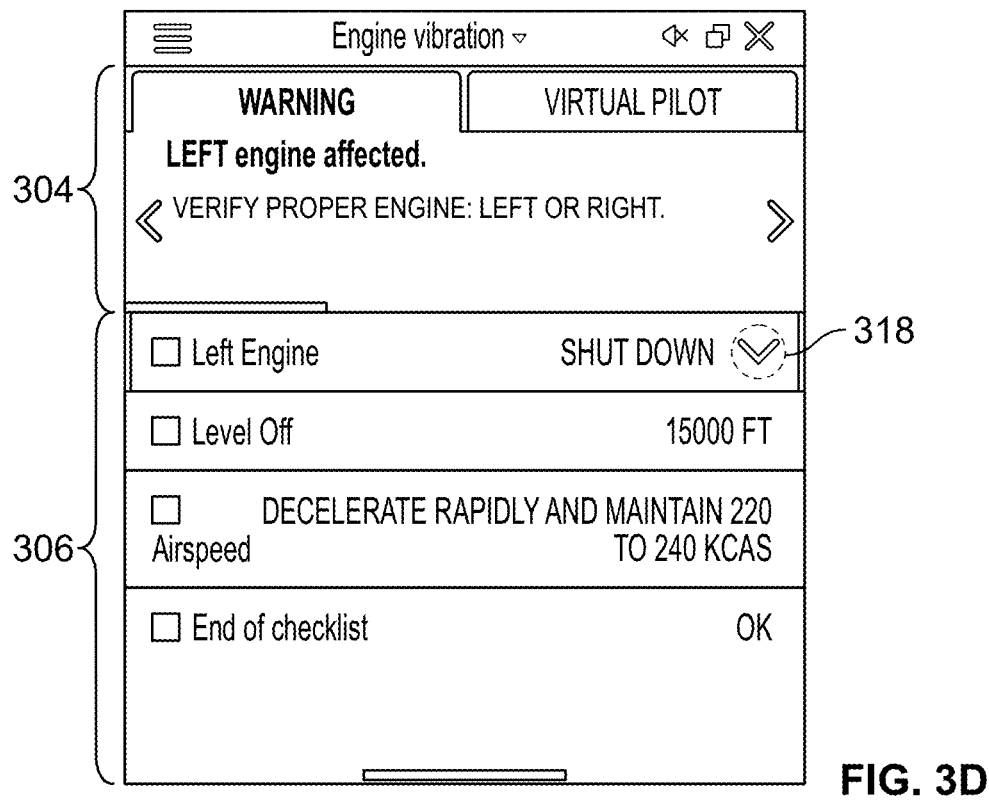
Figure 3E:
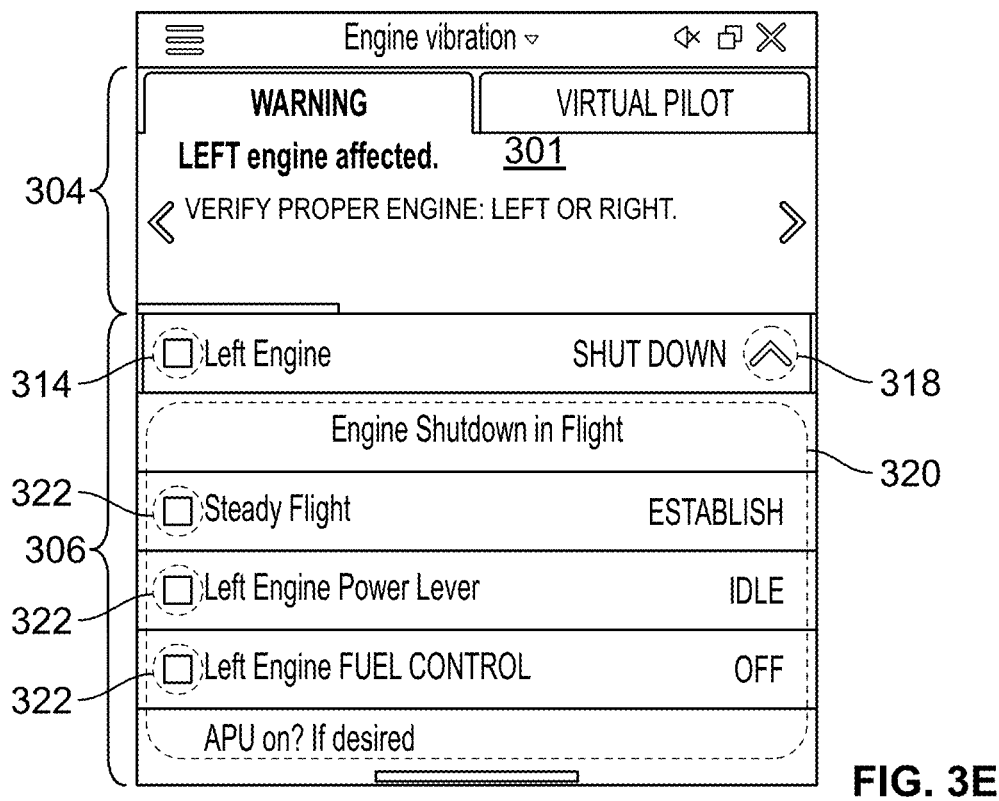

Referring to the example of FIGS. 3D and 3E, which illustrate an embodiment of a vertical nesting feature in an example ECL, an interactive nesting widget 318 is provided in a checklist item display panel 306 of an example ECL display window 207. The interactive nesting widget 318 on actuation (e.g., click/touch) allows a nested checklist to expand (e.g., drop down), so that items of a child checklist 320 are inserted into the parent checklist. In this example, the graphical implementation of the vertical nesting feature clearly shows where the insertion of the child checklist 320 is made, and which items belong to the parent and nested (child) checklists, (via the positioning of checkbox widgets 314, 322). The interactive nesting widget 318 is also configured to cause the nested checklist 320 to collapse (e.g., close) on actuation to reduce visual clutter. In this example, a clear indication regarding whether a nested checklist (e.g., child checklist 320) has been started but not completed and collapsed is provided via the state of checkbox widgets 322, wherein the unchecked state of a checkbox widget 322 indicates that a step in the child checklist 320 has not been completed.

In various embodiments, the enhanced checklist navigation and interaction features also include providing a defer option and a deferral cache. The defer option may be called by different names, such as, delay, postpone, later, shelve. "Defer" functionality provides a flight crew member with the option of postponing the completion of a checklist item and attending to the next checklist item. In various embodiments, a deferred graphic indicator, such as a unique graphical symbol and/or an appropriate color (e.g., an amber timing icon or an asterisk), can be used to indicate the deferred status of a checklist item. When a checklist item is deferred, the checklist item is placed into a deferral cache, and the deferred (or cached) item can be retrieved from the deferral cache for later action. When a checklist item requires the execution of a nested checklist, upon deferring the checklist item requiring the execution of a nested checklist, the entire nested checklist is deferred.

Figure 3F:
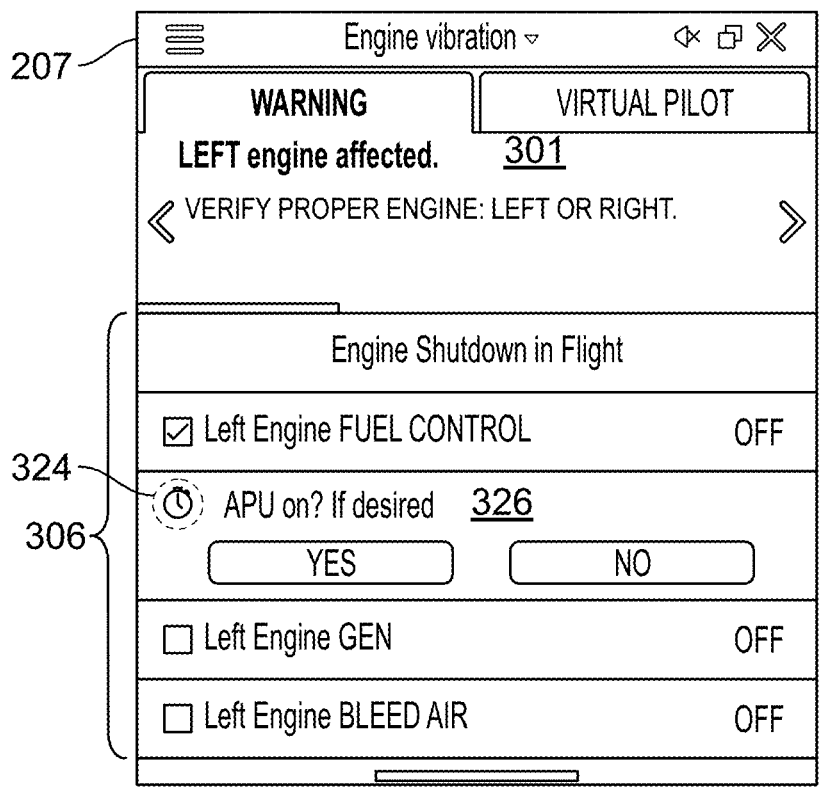

Referring to the example of FIG. 3F, which illustrates an embodiment of a defer option feature, a deferred graphic indicator 324 is provided in a checklist item display panel 306 of an example ECL display window 207. In this example, the deferred graphic indicator 324 (e.g., a timing icon or asterisk) and/or an appropriate color (e.g., an amber timing icon) is used to indicate the deferred status of a checklist item 326.

Figure 3G:
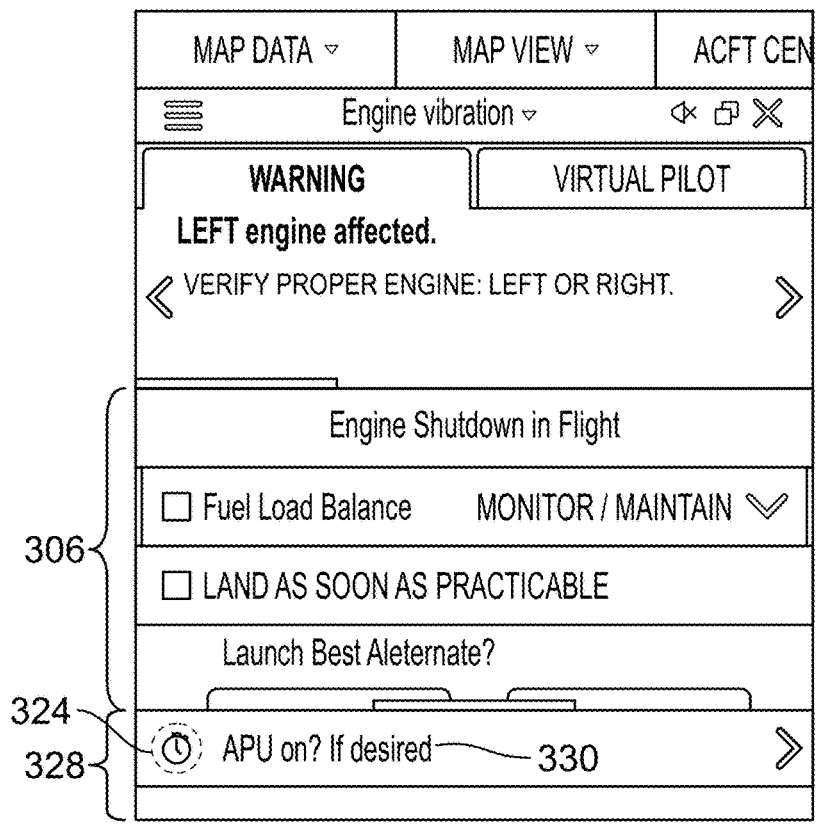

Referring to the example of FIG. 3G, which illustrates an embodiment of a deferral cache feature, a deferred graphic indicator 324 is provided in a deferral cache display panel 328 of an example ECL display window 207. When a checklist item is deferred, the checklist item is placed into the deferral cache (e.g., as illustrated in the example of FIG. 3E as locating the checklist item 330 below the checklist item display panel 306 in the deferral cache display panel 328), and the deferred (or cached) checklist item 330 can be retrieved from the cache (e.g., selection of the item) for later action. In this example, the deferred graphic indicator 324 (e.g., a timing icon or asterisk) is associated with a deferred (or cached) checklist item 330 to indicate that the deferred checklist item 330 is in the deferral cache.

In various embodiments, the information in the Annotations area relating to a checklist item is classified at one of a first priority level, a second priority level or a third priority level, wherein the first priority level has a higher level of importance than the second priority level and the second priority level has a higher level of importance than the third priority level. In various embodiments, the first priority level information includes warning information relating to an active checklist item, the second priority level information includes cautionary information relating to the active checklist item, and the third priority level information includes informative information relating to the active checklist item. In various embodiments, when the information relating to the active checklist item is classified at a first priority level, the annotations area is labeled with a warning label. In various embodiments, when the information relating to the active checklist item is classified at a second priority level, the annotations area is labeled with a caution label. In various embodiments, when the information relating to the active checklist item is classified at a third priority level, the annotations area is labeled with a notes label.

Figure 3H:
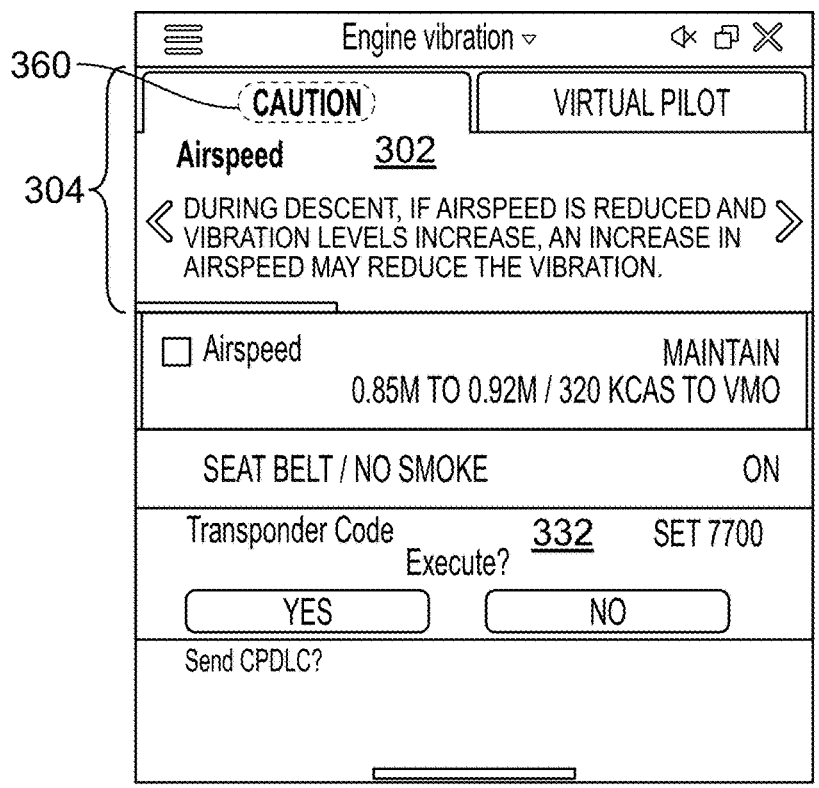

Referring to the example of FIG. 3H, which illustrates an embodiment of an annotation in the Annotations area 302 wherein the information relating to the active checklist item is classified at a second priority level, the annotations area is labeled with a caution label 360. Referring to the example of FIG. 3I, which illustrates an embodiment of an annotation in the Annotations area 302 wherein the information relating to the active checklist item is classified at a third priority level, the annotations area is labeled with a warning label 362.

In various embodiments, the enhanced checklist navigation and interaction features also include providing multi-modal interaction capability. A flight crew member may use a variety of modalities of choice for interaction with the checklist system including touch, speech, cursor-controlled device, or any combination of those modalities. Multi-modal interaction using speech includes both presenting checklist items audibly as well as controlling checklist item execution via a voice command.

In various embodiments, context-aware and dynamic features are provided to adjust the ECL generation system 202 functionality based on the current flight context. In various embodiments, the context-aware and dynamic features include optional nesting checklists. Some nested checklists might be necessary-completing them must be accomplished for the "master checklist" to be considered complete. Optional checklists are suggestions for the pilot. For example, an annotation might say "The APU may be used as an alternate source of electrical power, if desired. See xx-xx-xx, APU Inflight Operation—Alternate Electrical Power Source." In various embodiments, the example ECL generation system 202 is configured to differentiate between necessary and optional checklists. In various embodiments, the example ECL generation system 202 is configured to present necessary and optional checklists differently and allow dynamic interaction that is appropriate, e.g., the example ECL generation system 202 will not require the completion of an optional nested checklist in order to consider the parent checklist completed.

Figure 3I:
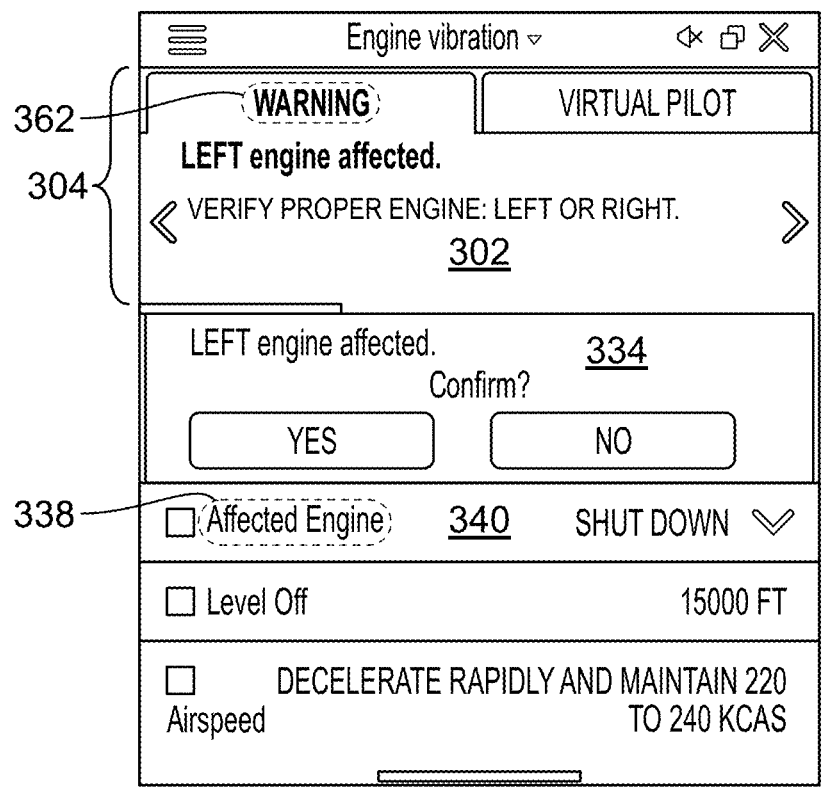
Figure 3J:
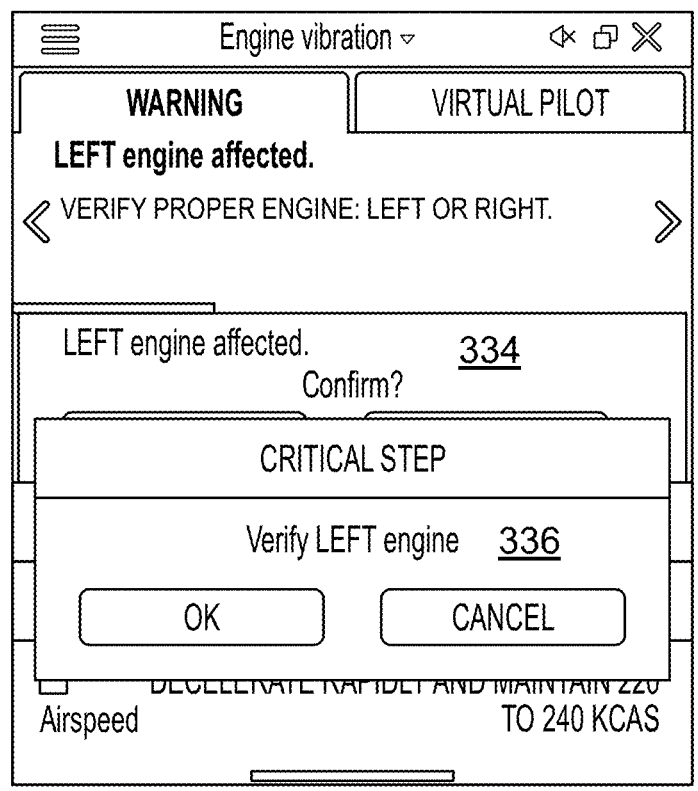
Figure 3K:
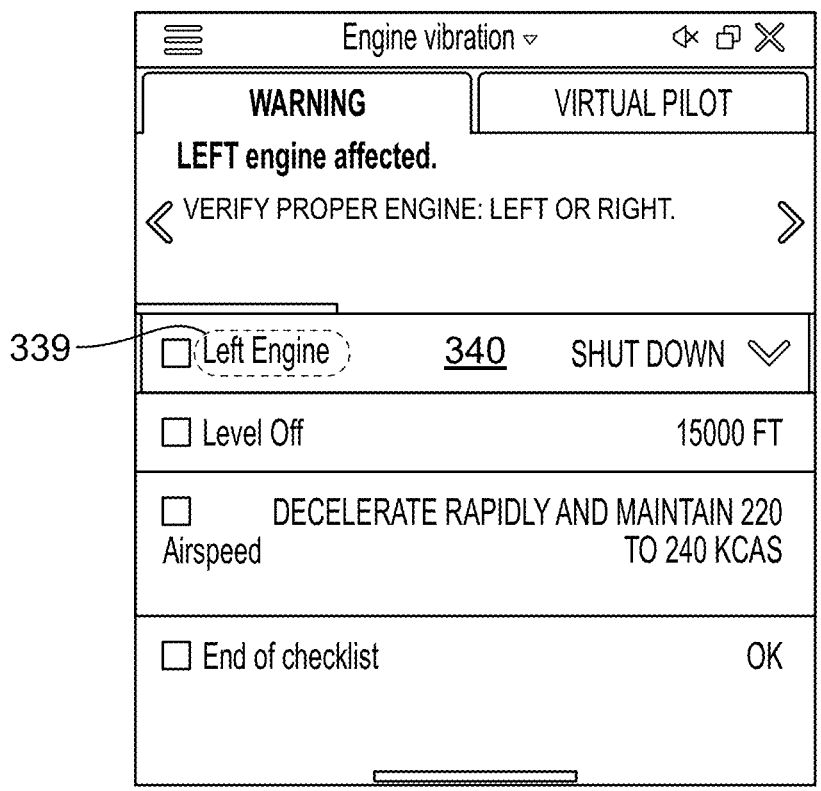
Figure 3L:
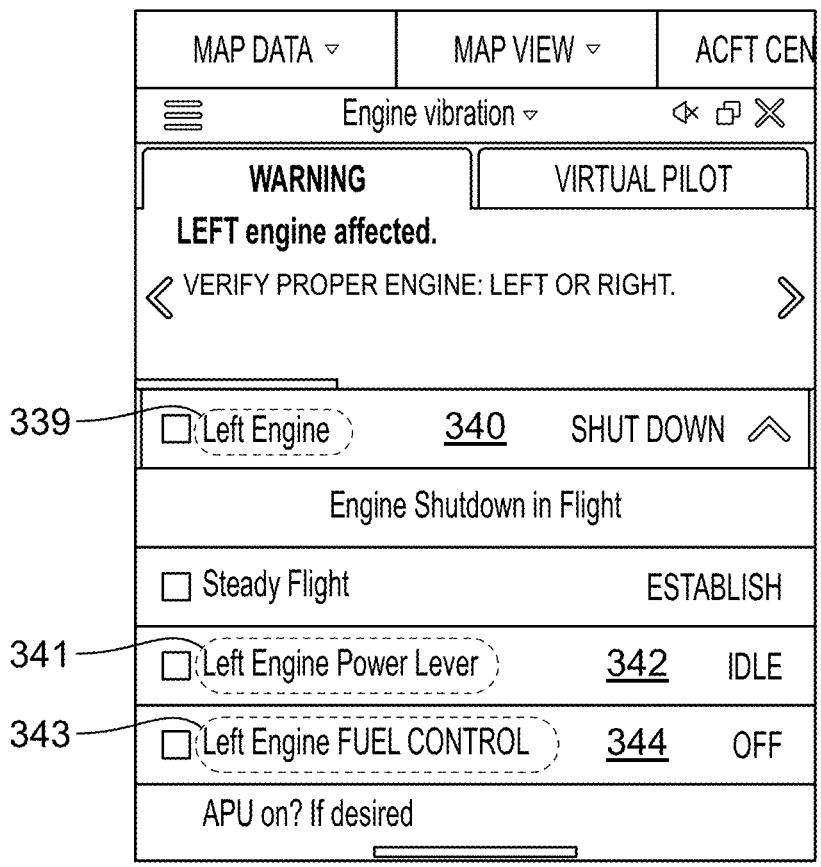

In various embodiments, the context-aware and dynamic features include self-edited steps. Many checklists are written in a generic way to avoid repetition, e.g., if a right or left engine is affected by vibrations, the checklist will mention "affected engine" ("Affected engine Power Lever IDLE") as illustrated by the label 338 for the checklist item 340 in FIG. 3I. Several more steps will mention "affected engine". Shutting down the wrong engine is potentially catastrophic. Based on sensors, readouts and/or confirmation by a flight crew member, the example ECL generation system 202 is configured to determine which avionics system is affected and auto-populate the rest of the checklist accordingly with the identity of the affected avionics system (e.g., left engine or right engine instead of affected engine) to minimize the error potential as illustrated by the label 339 for the checklist item 340 in FIG. 3L. In this example, after confirmation that the affected engine was the left engine as illustrated in FIGS. 3I and 3J, the ECL generation system 202 changed the label 338 for the checklist item 340 as illustrated in FIG. 3I to the label 339 for the checklist item 340 as illustrated in FIG. 3L. Also as illustrated in FIG. 3L, the ECL generation system 202 changed the labels 341 and 343 for checklist items 342 and 344, respectively, to auto-populate the rest of the checklist accordingly with the identity (left engine) of the affected avionics system.

In various embodiments, the context-aware and dynamic features include reflecting the completion status of previously executed steps from a parent checklist into a nested checklist so as to not duplicate information. For example, if the ATC has been contacted in the parent checklist and the context has not changed, a nested checklist either will not display "Contact ATC" step or will show it as inactive/completed.

Figure 3M:
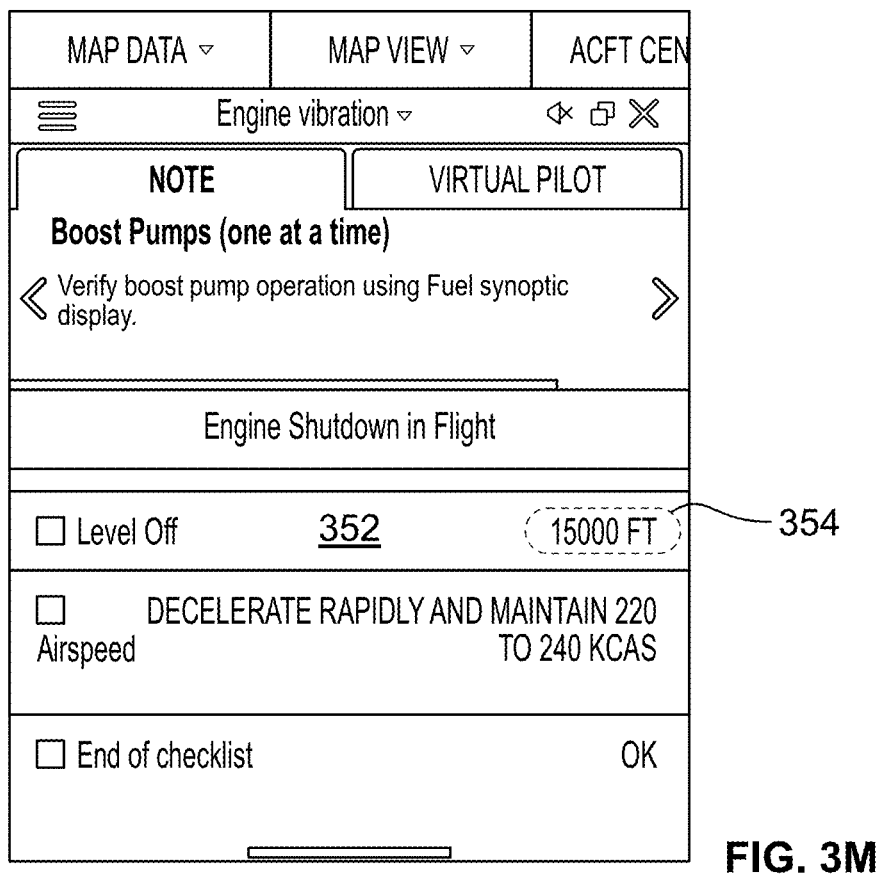

In various embodiments, the context-aware and dynamic features include generating system-calculated values. As an example, instead of referring a pilot to a page in QRH (e.g., performance table), the system could perform the calculation based on the available contextual information and provide the final value to the pilot. Referring to the example of FIG. 3M, in an embodiment of performing a calculation that would be helpful to the execution of a checklist item, a checklist item 352 requires an action, leveling off. The ECL generation system 202 calculates a level off value 354 (e.g., 15,000 feet) and suggests the calculated level off value 354 to the pilot. The example ECL generation system 202 is configured to provide the rationale for the decision (e.g., via the virtual pilot area), as well as a way to edit or reject the proposed value.

Figure 3N:
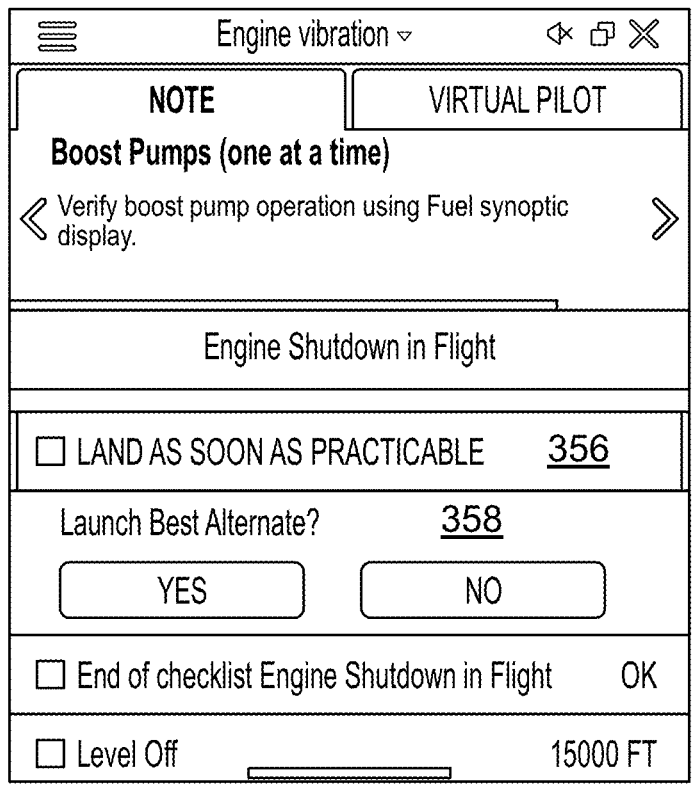

In various embodiments, the integrated, intelligent, and interactive features are implemented to simplify workflow. In various embodiments, the integrated, intelligent, and interactive features include incorporating outputs from other flight deck systems and applications to maintain context and situation awareness. In various embodiments, the example ECL generation system 202 is configured to pull information as needed, as well as push inputs into other systems (e.g., CPDLD). In various embodiments, the example ECL generation system 202 is configured to suggest that certain tabs and/or pages are opened and suggest that certain applications are launched that would be helpful to the execution of items in a checklist. Referring to the example of FIG. 3N, in an embodiment of suggesting the launching of an application that would be helpful to the execution of a checklist item, a checklist item 356 requires an action, landing as soon as practical. The ECL generation system 202 generates a pop up window 358 for suggesting the launching of a "Best Alternate" landing application for assisting with landing as soon as practical.

Figure 3O:
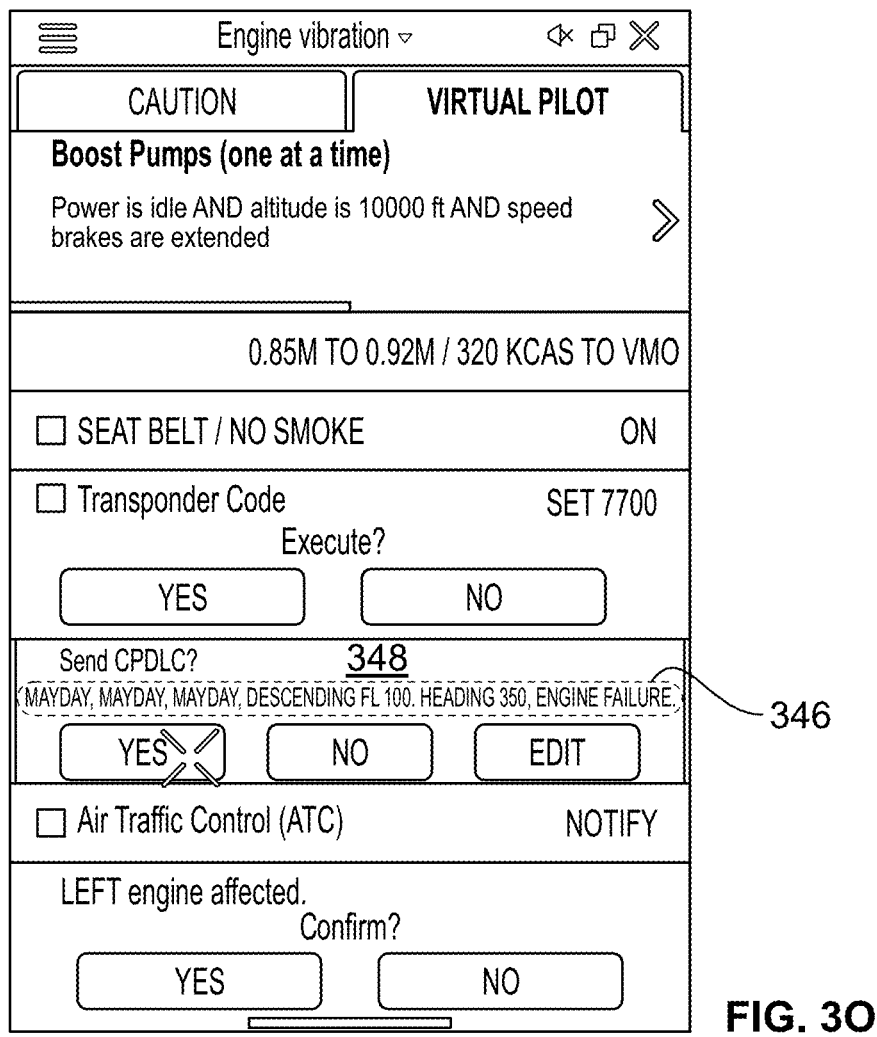
Figure 3P:
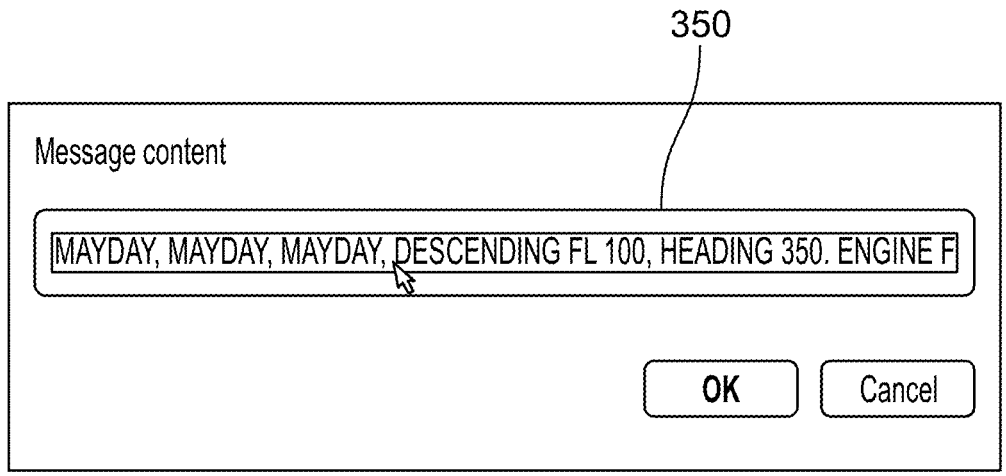

As an example of CPDLC (controller pilot data link communication) integration, certain checklist items require a pilot to establish contact with ATC. In various embodiments, the example ECL generation system 202 is configured to generate a context-appropriate CPDLC message and offer to send it from the checklist window. Referring to the example of FIG. 3O, which illustrates an embodiment of CPDLC integration, an example CPDLC message 346 has been generated by the example ECL generation system 202 for satisfying a checklist item requiring pilot contact with ATC. In various embodiments, the example ECL generation system 202 is configured to provide an option to edit the suggested message as illustrated by the pop up window 348 in FIG. 3O. In various embodiments, the example ECL generation system 202 is further configured to automatically check as complete a "Contact ATC" checklist item when the suggested CPDLC message is sent.

In various embodiments, the integrated, intelligent, and interactive features include providing a virtual pilot feature, automated items, semi-automated items, and confirmation for certain critical items. In various embodiments, the virtual pilot feature includes providing an explanation of the basis for suggestions by the ECL generation system 202 in a virtual pilot area 301 (e.g., virtual pilot area 118). For example, if the example ECL generation system 202 suggests an input to the pilot (e.g. calculates optimum altitude, provides automatic assessment of a situation based on aggregated signals), the example ECL generation system 202 is configured to provide an explanation of the basis of its suggestions to help a pilot maintain situational awareness and a valid model of its teammate (system). In various embodiments, such explanation is provided in a dedicated area (e.g., virtual pilot area 301 or in line with the associated checklist item). In various embodiments, the explanation is provided on demand (pilot interacts with the HMI to receive the explanation) or via an unsolicited pop up.

In various embodiments, the automated items feature includes executing certain non-critical steps automatically when the set conditions are met (e.g., when the checklist item has been identified as being acceptable for automatic completion without confirmation). In various embodiments, the example ECL generation system 202 is configured to provide an explanation of non-critical steps being automatically executed to help a pilot maintain situational awareness, as illustrated in the example of FIG. 3B with the explanation in the virtual pilot area 301.

In various embodiments, the semi-automated items feature includes executing certain steps upon pilot confirmation to lower a pilot's workload. For example, the ECL might display the step and a question "Execute?" with "Yes" and "No" options as illustrated by checklist item 332 in FIG. 3H. Choosing "Yes" would be considered a confirmation that would enable the system to complete the step for the pilot. If it is a critical item, a secondary confirmation might be required, such as a pop up window informing a pilot that this is a critical step with "Confirm" and "Cancel" options.

In various embodiments, the semi-automated items feature includes requiring a second confirmation for certain critical items. For Single Pilot Operations, a second pilot is not available to verify tasks, especially critical items. In various embodiments, example ECL generation system 202 is configured to replace the required confirmation of a second pilot with a system confirmation to minimize an error potential as illustrated in FIGS. 3I and 3J by checklist item 334 and pop up window 336. In various embodiments, the distinct confirmation is in the form of a secondary confirmation after an initial confirmation as illustrated by the pop up window 336 in FIG. 3J.

In various embodiments, an example ECL implemented by the example ECL generation system 202 is also configured to provide an editing interface. In various embodiments, the editing interface enables a pilot to edit system-generated inputs (e.g., CPDLC messages, calculated altitude, etc.). In various embodiments, the editing is called up by the example ECL generation system 202 in each instance of the system-suggested inputs. Referring to the example of FIG. 3P, which illustrates an embodiment of an editing interface 350, an example CPDLC message 346, such as that illustrated in FIG. 3O, may be edited.

Figure 4:
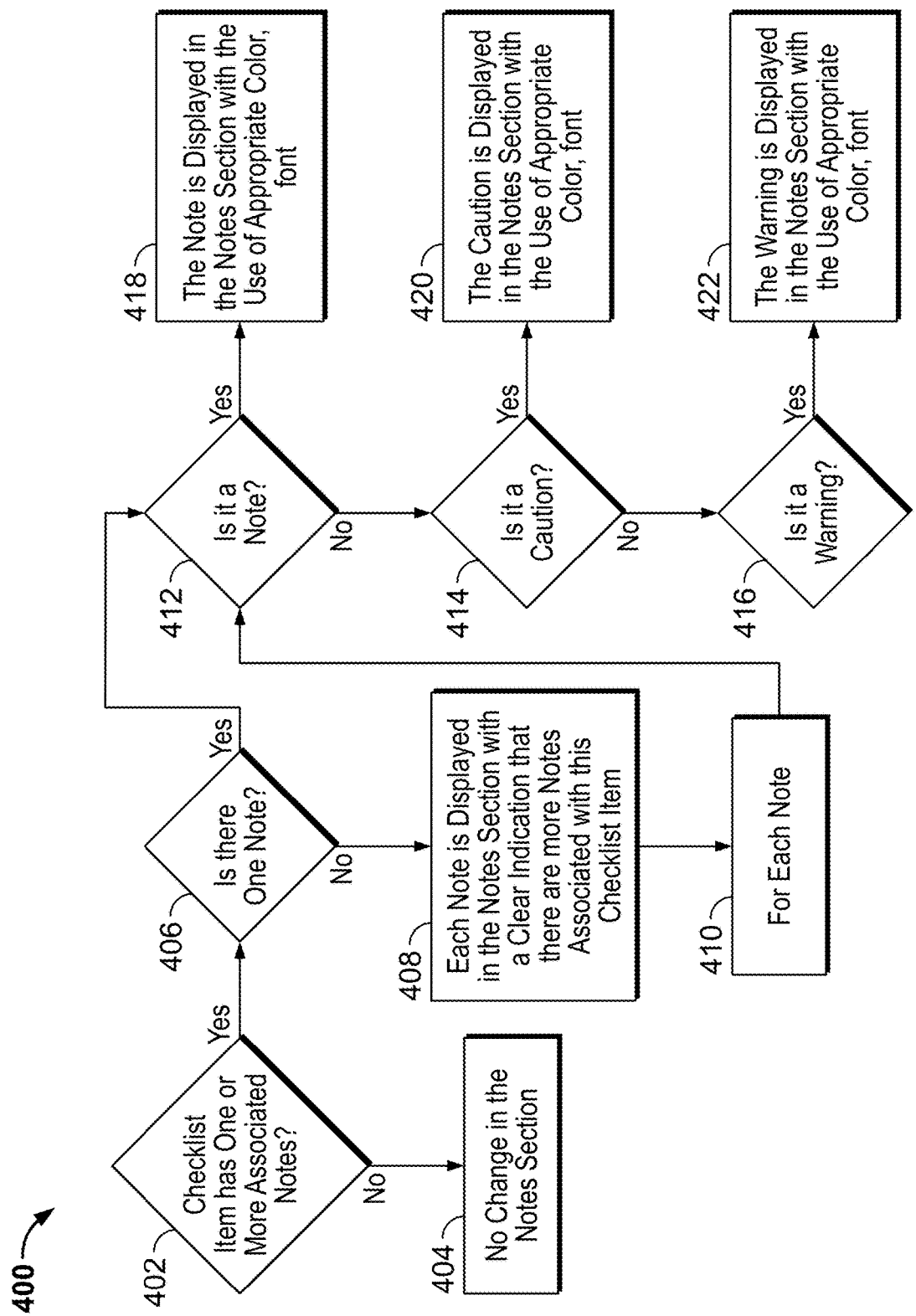
FIG. 4 is a process flow chart depicting an example process for displaying checklist information in a dedicated annotations area of an ECL, in accordance with various embodiments.

FIG. 4 is a process flow chart depicting an example process 400 for displaying annotations in a dedicated annotations area of an ECL, in accordance with various embodiments. The order of operation within the process 400 is not limited to the sequential execution as illustrated in the figure, but may be performed in one or more varying orders as applicable and in accordance with the present disclosure.

At operation 402, the example process 400 includes determining whether a checklist item has one or more associated annotations. If at operation 402 it is determined that a checklist item does not have one or more associated annotations (no at operation 402), then no change is made in the annotations area at operation 404. If at operation 402, it is determined that a check list item does have one or more associated annotations (yes at operation 402), then at operation 406 a determination is made regarding whether there is one annotation or multiple annotations.

If at operation 406, it is determined that there are multiple annotations for the checklist item (no at operation 406), each annotation is displayed in the annotations area with a clear indication that there are more annotations associated with this checklist item (operation 408). At operation 410, for each annotation a determination is made regarding whether the annotation is a note (at operation 412), a caution (at operation 414), or a warning (at operation 416). If at operation 406, it is determined that there is only one annotation for the checklist item (yes at operation 406), a determination is made regarding whether the annotation is a note (at operation 412), a caution (at operation 414), or a warning (at operation 416).

If it is determined that the annotation is a note at operation 412, then the annotation is displayed (at operation 418) in the annotations area with the use of an appropriate color (e.g., black) and font (e.g., note label). If it is determined that the annotation is a caution at operation 414, then the annotation is displayed (at operation 420) in the annotations area with the use of an appropriate color (e.g., yellow) and font (e.g., caution label). If it is determined that the annotation is a at operation 416, then the annotation is displayed (at operation 422) in the annotations area with the use of an appropriate color (e.g., red) and font (e.g., warning label).

Figure 5:
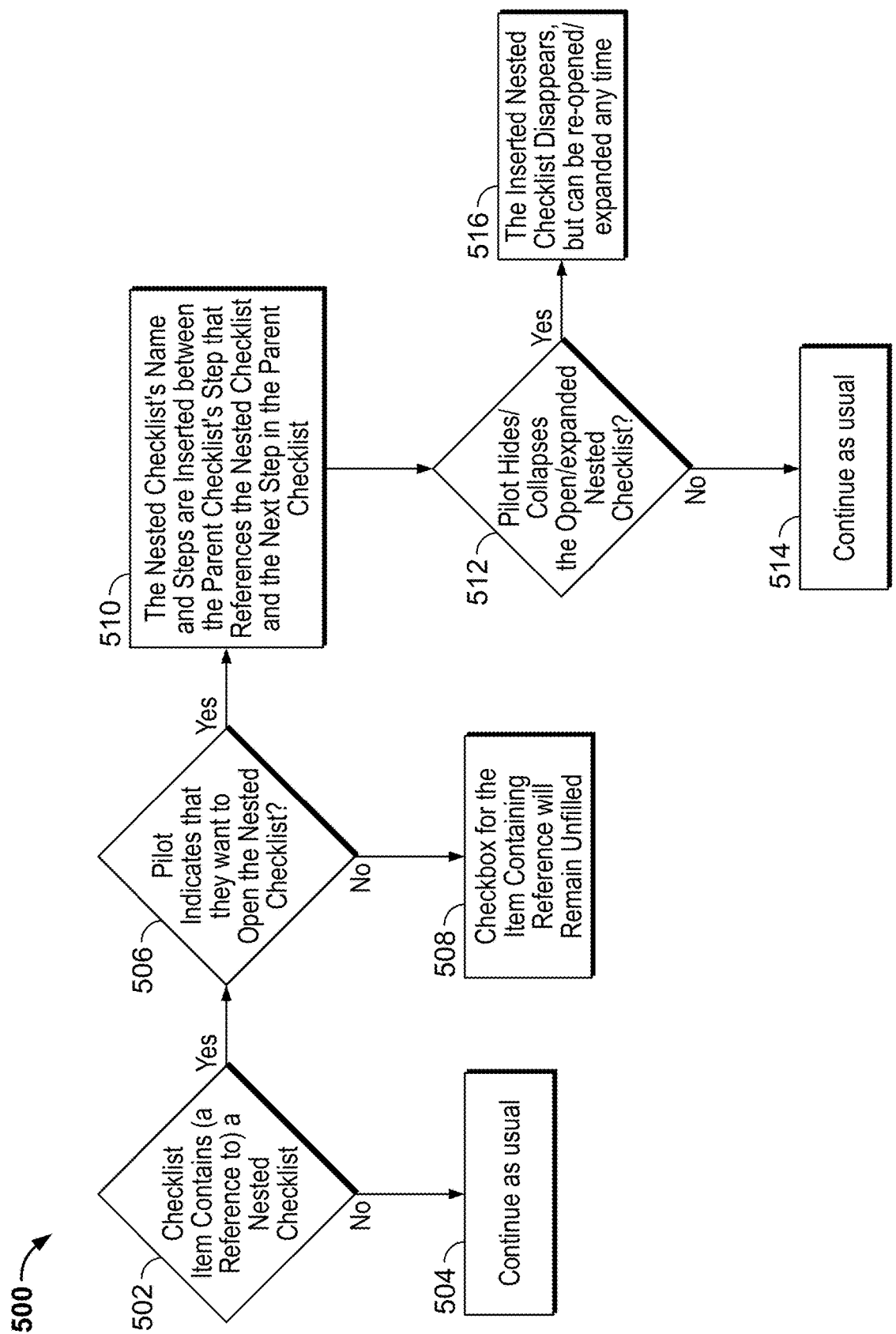
FIG. 5 is a process flow chart depicting an example process for displaying nested checklists in an ECL, in accordance with various embodiments.

FIG. 5 is a process flow chart depicting an example process for displaying nested checklists in an ECL, in accordance with various embodiments. The order of operation within the process 500 is not limited to the sequential execution as illustrated in the figure, but may be performed in one or more varying orders as applicable and in accordance with the present disclosure.

At operation 502, the example process 500 includes determining whether a checklist item contains a reference to a nested checklist. If it is determined that a checklist item does not contain a reference to a nested checklist (no at operation 502), then the example process 500 includes continuing as usual at operation 504.

If it is determined that a checklist item does contain a reference to a nested checklist (yes at operation 502), then a determination is made at operation 506 regarding whether a pilot indicates that they want to open the nested checklist. If the pilot indicates that they do not want to open the nested checklist (no at operation 506), then at operation 508 the checkbox for the item containing the reference will remain unfilled. If the pilot indicates that they want to open the nested checklist (yes at operation 506), then at operation 510 the name of the nested checklist and steps of the nested checklist are inserted between the steps of the parent checklist that references the nested checklist and the next step in the parent checklist.

At operation 512, the example process 500 includes determining whether the pilot has hidden or collapsed the open or expanded nested checklist. If the pilot has not hidden or collapsed the open or expanded nested checklist (no at operation 512), then the process 500 continues as usual at operation 514. If the pilot has hidden or collapsed the open or expanded nested checklist (yes at operation 512), then at operation 516 the inserted nested checklist disappears, but can be reopened or expanded later.

Figure 6:
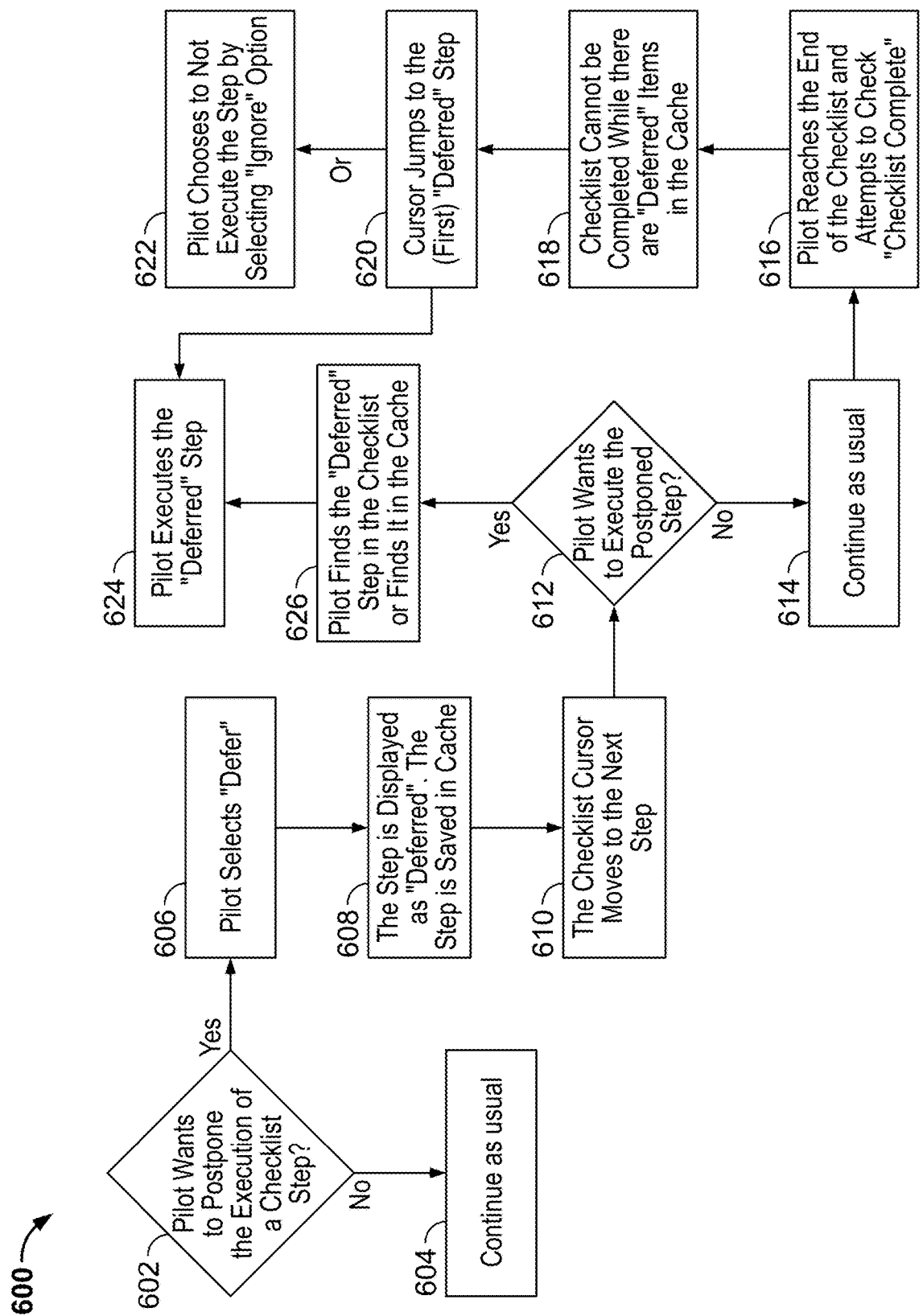
FIG. 6 is a process flow chart depicting an example process for implementing a checklist item deferral feature in an ECL, in accordance with various embodiments.

FIG. 6 is a process flow chart depicting an example process for implementing a checklist item deferral feature in an ECL, in accordance with various embodiments. The order of operation within the process 600 is not limited to the sequential execution as illustrated in the figure, but may be performed in one or more varying orders as applicable and in accordance with the present disclosure.

At operation 602, the example process 600 includes determining whether a pilot wants to postpone the execution of a checklist step. If it is determined that the pilot does not want to postpone the execution of a checklist step (no at operation 602), then the example process 600 includes continuing as usual at operation 604. If it is determined that the pilot does want to postpone the execution of a checklist step (yes at operation 602), then the example process 600 includes the pilot selecting to defer the step at operation 606.

At operation 608, the example process 600 includes displaying the checklist step as deferred and saving the checklist step in a deferral cache. At operation 610, the example process 600 includes the checklist cursor moving to the next step.

At operation 612, a determination is made regarding whether the pilot wants to execute the postponed step. If it is determined that the pilot does not want to execute the postponed step (no at operation 612), the example process continues as usual at step 614.

At operation 616, the pilot reaches the end of the checklist and attempts to check "checklist complete". At operation 618, the checklist cannot be completed while there are deferred items in the cache. At operation 620, the cursor jumps to the first (or next) deferred step. At operation 622, the pilot chooses to not execute the step by selecting an ignore option. Alternatively, at operation 624, the pilot executes the deferred step.

If it is determined that the pilot does want to execute the postponed step (yes at operation 612), then the pilot finds the deferred step in the checklist or finds it in the cache at operation 626. At operation 624, the pilot executes the deferred step.

In some aspects, the techniques described herein relate to a system in an aerial vehicle for providing an intelligent electronic checklist (ECL), the system including: a display device; and a controller including one or more processors and non-transitory computer readable media encoded with programming instructions, the controller configured to: receive aircraft data from one or more avionics systems; select, based on the aircraft data, an appropriate ECL; generate an ECL display window, the ECL display window including a checklist information display panel and a checklist item display panel, the checklist information display panel having an annotations area and a virtual pilot area; populate the checklist item display panel with a plurality of checklist items from the ECL, wherein the checklist item display panel is scrollable to display checklist items from the ECL that occur earlier or later than a checklist item that is in focus; automatically populate the annotations area with information relating to a checklist item that is active; and cause the ECL display window to be displayed on the display device.

In some aspects, the techniques described herein relate to a system, wherein the annotations area is provided by a first tab, the virtual pilot area is provided by a second tab, the information relating to the first checklist item is automatically classified according to one of a first priority level, a second priority level, or a third priority level, and wherein the first tab is provided with a warning label when the information relating to the first checklist item is classified according to the first priority level, the first tab is provided with a caution label when the information relating to the first checklist item is classified according to the second priority level, and the first tab is provided with a notes label when the information relating to the first checklist item is classified according to the third priority level.

In some aspects, the techniques described herein relate to a system, wherein the controller is further configured to populate the virtual pilot area with a description of an action taken by the controller relating to a checklist item that is active from the plurality of checklist items when the controller has automatically taken the action.

In some aspects, the techniques described herein relate to a system, wherein the controller is further configured to populate the virtual pilot area with an explanation of basis for a suggestion relating to a checklist item that is active when the controller has made the suggestion.

In some aspects, the techniques described herein relate to a system, wherein the annotations area includes a graphical element that is actuatable for enabling navigation between multiple annotations pertaining to an active checklist item.

In some aspects, the techniques described herein relate to a system, wherein the controller is further configured to cause information relating to a checklist item that is no longer active to be displayed in a visually distinguishable manner from how information relating to a checklist item that is active is displayed.

In some aspects, the techniques described herein relate to a system, wherein the controller is further configured to cause a nested checklist to be displayed within a parent checklist.

In some aspects, the techniques described herein relate to a system, wherein the controller is further configured to provide an interactive nesting widget associated with an expandable checklist item in the checklist item display panel that is actuatable to cause checklist items of the nested checklist to be displayed within the parent checklist, and that is actuatable to collapse the nested checklist wherein the nested checklist ceases from being displayed within the parent checklist.

In some aspects, the techniques described herein relate to a system, wherein the controller is further configured to provide an option to defer completion of a checklist item wherein completion of a deferred checklist item is postponed, and a next checklist item becomes active.

In some aspects, the techniques described herein relate to a system, wherein the controller is further configured to provide a deferred graphic indicator that indicates that the deferred checklist item has been deferred.

In some aspects, the techniques described herein relate to a system, wherein the controller is further configured to provide a deferral cache panel in the ECL display window through which the deferred checklist item is identified.

In some aspects, the techniques described herein relate to a system, wherein the controller is further configured to provide an optional nested checklist wherein completion of the optional nested checklist is not necessary for completion of the parent checklist.

In some aspects, the techniques described herein relate to a system, wherein the controller is further configured to automatically edit a future checklist item with a specific reference to an affected aircraft system based on an identification of the affected aircraft system.

In some aspects, the techniques described herein relate to a system, wherein the controller is further configured to: automatically calculate a value for a checklist item; and populate the checklist item with the automatically calculated value.

In some aspects, the techniques described herein relate to a system, wherein the controller is further configured to provide a rationale for the automatically calculated value in the virtual pilot area.

In some aspects, the techniques described herein relate to a system, wherein the controller is further configured to provide a user option to accept or reject the automatically calculated value.

In some aspects, the techniques described herein relate to a system, wherein the controller is further configured to provide an editing interface for editing the automatically calculated value.

In some aspects, the techniques described herein relate to a system, wherein the controller is further configured to provide multi-modal interaction with the ECL including speech interaction and one or more of touch interaction and cursor interaction.

In some aspects, the techniques described herein relate to a system, wherein the multi-modal interaction with speech includes controlling checklist item interaction via a voice command.

In some aspects, the techniques described herein relate to a system, wherein the controller is further configured to automatically reflect the status of previously executed checklist items from a parent checklist into a checklist item in a nested checklist.

In some aspects, the techniques described herein relate to a system, wherein the controller is further configured to automatically generate a message for delivery to another flight deck system based on a checklist item.

In some aspects, the techniques described herein relate to a system, wherein the controller is further configured to automatically execute a checklist item when the checklist item has been identified as being acceptable for automatic completion without confirmation.

In some aspects, the techniques described herein relate to a system, wherein the controller is further configured to automatically execute a checklist item after receiving a confirmation that the checklist item should be automatically executed.

In some aspects, the techniques described herein relate to a system, wherein the controller is further configured to automatically execute a checklist item after receiving multiple confirmations that the checklist item should be automatically executed.

In some aspects, the techniques described herein relate to a method in an aerial vehicle for providing an intelligent electronic checklist (ECL), the system including: receiving aircraft data from one or more avionics systems; selecting, based on the aircraft data, an appropriate ECL; generating an ECL display window, the ECL display window including an checklist information display panel and a checklist item display panel, the checklist information display panel having an annotations area and a virtual pilot area; populating the checklist item display panel with a plurality of checklist items from the ECL, wherein the checklist item display panel is scrollable to display checklist items from the ECL that occur earlier or later than a checklist item that is in focus; automatically populating the annotations area with information relating to a checklist item that is active; and displaying the ECL display window on a display device.

In some aspects, the techniques described herein relate to a method, wherein the annotations area is provided by a first tab, the virtual pilot area is provided by a second tab, the information relating to the first checklist item is automatically classified according to one of a first priority level, a second priority level or a third priority level, and wherein the first tab is provided with a warning label when the information relating to the first checklist item is classified according to the first priority level, the first tab is provided with a caution label when the information relating to the first checklist item is classified according to the second priority level, and the first tab is provided with a notes label when the information relating to the first checklist item is classified according to the third priority level.

In some aspects, the techniques described herein relate to a method, further including populating the virtual pilot area with a description of an automatic action taken relating to a checklist item that is active from the plurality of checklist items when the action has been automatically taken.

In some aspects, the techniques described herein relate to a method, further including populating the virtual pilot area with an explanation of basis for a suggestion relating to a checklist item that is active when the suggestion has been automatically made.

In some aspects, the techniques described herein relate to a method, wherein the annotations area includes a graphical element that is actuatable for enabling navigation between multiple annotations pertaining to an active checklist item.

In some aspects, the techniques described herein relate to a method, further including displaying information relating to a checklist item that is no longer active in a visually distinguishable manner from how information relating to a checklist item that is active is displayed.

In some aspects, the techniques described herein relate to a method, further including displaying a nested checklist within a parent checklist.

In some aspects, the techniques described herein relate to a method, further including providing an interactive nesting widget associated with an expandable checklist item in the checklist item display panel that is actuatable to cause checklist items of the nested checklist to be displayed within the parent checklist, and that is actuatable to collapse the nested checklist wherein the nested checklist ceases from being displayed within the parent checklist.

In some aspects, the techniques described herein relate to a method, further including providing an option to defer completion of a checklist item wherein completion of a deferred checklist item is postponed, and a next checklist item becomes active.

In some aspects, the techniques described herein relate to a method, further including providing a deferred graphic indicator that indicates that the deferred checklist item has been deferred.

In some aspects, the techniques described herein relate to a method, further including providing a deferral cache panel in the ECL display window through which the deferred checklist item is identified.

In some aspects, the techniques described herein relate to a method, further including providing an optional nested checklist wherein completion of the optional nested checklist is not necessary for completion of the parent checklist.

In some aspects, the techniques described herein relate to a method, further including automatically editing a future checklist item with a specific reference to an affected aircraft system based on an identification of the affected aircraft system.

In some aspects, the techniques described herein relate to a method, further including: automatically calculating a value for a checklist item; and populating the checklist item with the automatically calculated value.

In some aspects, the techniques described herein relate to a method, further including providing a rationale for the automatically calculated value in the virtual pilot area.

In some aspects, the techniques described herein relate to a method, further including providing a user option to accept or reject the automatically calculated value.

In some aspects, the techniques described herein relate to a method, further including providing an editing interface for editing the automatically calculated value.

In some aspects, the techniques described herein relate to a method, further including providing multi-modal interaction with the ECL including speech interaction and one or more of touch interaction and cursor interaction.

In some aspects, the techniques described herein relate to a method, wherein the multi-modal interaction with speech includes controlling checklist item interaction via a voice command.

In some aspects, the techniques described herein relate to a method, further including automatically reflecting the status of previously executed checklist items from a parent checklist into a checklist item in a nested checklist.

In some aspects, the techniques described herein relate to a method, further including automatically generating a message for delivery to another flight deck system based on a checklist item.

In some aspects, the techniques described herein relate to a method, further including automatically executing a checklist item when the checklist item has been identified as being acceptable for automatic completion without confirmation.

In some aspects, the techniques described herein relate to a method, further including automatically executing a checklist item after receiving a confirmation that the checklist item should be automatically executed.

In some aspects, the techniques described herein relate to a method, further including automatically executing a checklist item after receiving multiple confirmations that the checklist item should be automatically executed.

In some aspects, the techniques described herein relate to an intelligent electronic checklist (ECL) system including: a controller including one or more processors and non-transitory computer readable media encoded with programming instructions, the controller configured to: receive aircraft data from one or more avionics systems; select, based on the aircraft data, an appropriate ECL; generate an ECL display window, the ECL display window including an checklist information display panel and a checklist item display panel, the checklist information display panel having an annotations area and a virtual pilot area; populate the checklist item display panel with a plurality of checklist items from the ECL, wherein the checklist item display panel is scrollable to display checklist items from the ECL that occur earlier or later than a checklist item that is in focus; automatically populate the annotations area with information relating to a checklist item that is active; and cause the ECL display window to be displayed on the display device.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system in an aerial vehicle for providing an intelligent electronic checklist (ECL), the system comprising:
    a display device; and
    a controller comprising one or more processors and non-transitory computer readable media encoded with programming instructions, the controller configured to:
        receive aircraft data from one or more avionics systems;
        select, based on the aircraft data, an appropriate ECL, the appropriate ECL comprising a plurality of checklist items that are to be performed to complete the ECL;
        generate an ECL display window, the ECL display window comprising a checklist information display panel and a checklist item display panel, the checklist information display panel comprising a first tab and an annotations area that is accessible via the first tab and that displays one or more annotations that are associated with a checklist item from the ECL that is active, the checklist information display panel further comprising a second tab and a virtual pilot area configured for displaying an explanation for the checklist item from the ECL that is active wherein the virtual pilot area is accessible via the second tab;
        populate the checklist item display panel with a plurality of checklist items from the ECL, wherein the checklist item display panel is scrollable to display checklist items from the ECL that occur earlier or later than a checklist item that is in focus;
        automatically populate the annotations area with information relating to a checklist item that is active;
        automatically classify the information relating to the checklist item according to a first priority level when the information comprises a first level of importance,
        automatically classify the information relating to a checklist item according to a second priority level when the information comprises a second level of importance;
        automatically classify the information relating to a checklist item according to a third priority level when the information comprises a third level of importance;
        wherein the first priority level has a higher level of importance than the second priority level and the second priority level has a higher level of importance than the third priority level;
        provide the first tab with a warning label when the information relating to the checklist item is classified according to the first priority level;
        provide the first tab with a caution label when the information relating to the checklist item is classified according to the second priority level;
        provide the first tab with a notes label when the information relating to the checklist item is classified according to the third priority level; and
        cause the ECL display window to be displayed on the display device.

2. The system of claim 1, wherein the controller is further configured to populate the virtual pilot area with a description of an action taken by the controller after automatically performing a checklist item that is active.

3. The system of claim 1, wherein the controller is further configured to populate the virtual pilot area with an explanation of basis for a suggestion relating to a checklist item that is active when the controller has made the suggestion.

4. The system of claim 1, wherein the annotations area includes a graphical element that is actuatable for enabling navigation between multiple annotations pertaining to an active checklist item.

5. The system of claim 1, wherein the controller is further configured to cause information relating to a checklist item that is no longer active to be displayed in a visually distinguishable manner from how information relating to a checklist item that is active is displayed.

6. The system of claim 1, wherein the controller is further configured to cause a nested checklist to be displayed within a parent checklist.

7. The system of claim 6, wherein the controller is further configured to provide an interactive nesting widget associated with an expandable checklist item in the checklist item display panel that is actuatable to cause checklist items of the nested checklist to be displayed within the parent checklist, and that is actuatable to collapse the nested checklist wherein the nested checklist ceases from being displayed within the parent checklist.

8. The system of claim 1, wherein the controller is further configured to provide:
    an option to defer completion of a checklist item wherein completion of a deferred checklist item is postponed and a next checklist item becomes active; and
    a deferred graphic indicator that indicates that the deferred checklist item has been deferred.

9. The system of claim 8, wherein the controller is further configured to provide a deferral cache panel in the ECL display window through which the deferred checklist item is identified.

10. The system of claim 1, wherein the controller is further configured to automatically generate a message for delivery to another flight deck system based on a checklist item.

11. The system of claim 1, wherein the controller is further configured to automatically execute a checklist item when the checklist item has been identified as being acceptable for automatic completion without confirmation.

12. The system of claim 1, wherein the controller is further configured to automatically execute a checklist item after receiving a confirmation that the checklist item should be automatically executed.

13. A method in an aerial vehicle for providing an intelligent electronic checklist (ECL), the method comprising:
    receiving aircraft data from one or more avionics systems;
    selecting, based on the aircraft data, an appropriate ECL;
    generating an ECL display window, the ECL display window comprising a checklist information display panel and a checklist item display panel, the checklist information display panel comprising a first tab and an annotations area that is accessible via the first tab and that displays one or more annotations that are associated with a checklist item from the ECL that is active, the checklist information display panel further comprising a second tab and a virtual pilot area configured for displaying an explanation for the checklist item from the ECL that is active wherein the virtual pilot area is accessible via the second tab;

populating the checklist item display panel with a plurality of checklist items from the ECL, wherein the checklist item display panel is scrollable to display checklist items from the ECL that occur earlier or later than a checklist item that is in focus;

automatically populating the annotations area with information relating to a checklist item that is active;

populating the virtual pilot area with a description of an action taken by a controller in the aerial vehicle after automatically performing a checklist item that is active;

automatically classifying the information relating to the checklist item according to one of a first priority level, a second priority level, or a third priority level;

providing the first tab with a warning label when the information relating to the checklist item is classified according to the first priority level;

providing the first tab with a caution label when the information relating to the checklist item is classified according to the second priority level;

providing the first tab with a notes label when the information relating to the checklist item is classified according to the third priority level; and displaying the ECL display window on a display device.

14. The method of claim 13, further comprising:

populating the checklist item display panel with a nested checklist within a parent checklist; and providing an interactive nesting widget associated with an expandable checklist item in the checklist item display panel that is actuatable to cause checklist items of the nested checklist to be displayed within the parent checklist, and that is actuatable to collapse the nested checklist wherein the nested checklist ceases from being displayed within the parent checklist.

15. An intelligent electronic checklist (ECL) system comprising:

a controller comprising one or more processors and non-transitory computer readable media encoded with programming instructions, the controller configured to:

receive aircraft data from one or more avionics systems;

select, based on the aircraft data, an appropriate ECL;

generate an ECL display window, the ECL display window comprising a checklist information display panel and a checklist item display panel, the checklist information display panel comprising a first tab and an annotations area that is accessible via the first tab and that displays one or more annotations that are associated with a checklist item from the ECL that is active, the checklist information display panel further comprising a second tab and a virtual pilot area configured for displaying an explanation for the checklist item from the ECL that is active wherein the virtual pilot area is accessible via the second tab;

populate the checklist item display panel with a plurality of checklist items from the ECL, wherein the checklist item display panel is scrollable to display checklist items from the ECL that occur earlier or later than a checklist item that is in focus;

automatically populate the annotations area with information relating to a checklist item that is active;

populate the virtual pilot area with a description of an action taken by the controller after automatically performing a checklist item that is active;

automatically classify the information relating to the checklist item according to one of a first priority level, a second priority level, or a third priority level;

provide the first tab with a warning label when the information relating to the checklist item is classified according to the first priority level;

provide the first tab with a caution label when the information relating to the checklist item is classified according to the second priority level;

provide the first tab with a notes label when the information relating to the checklist item is classified according to the third priority level; and cause the ECL display window to be displayed on a display device.

16. The ECL system of claim 15, wherein the controller is further configured to provide an optional nested checklist wherein completion of the optional nested checklist is not necessary for completion of a parent checklist.

17. The ECL system of claim 15, wherein the controller is further configured to automatically edit a future checklist item with a specific reference to an affected aircraft system based on an identification of the affected aircraft system.

18. The ECL system of claim 15, wherein the controller is further configured to:

automatically calculate a value for a checklist item;

populate the checklist item with the automatically calculated value; and provide a rationale for the automatically calculated value in the virtual pilot area.

19. The ECL system of claim 15, wherein the controller is further configured to provide multi-modal interaction with the ECL including speech interaction and one or more of touch interaction and cursor interaction.

20. The ECL system of claim 15, wherein the controller is further configured to automatically reflect a status of previously executed checklist items from a parent checklist into a checklist item in a nested checklist.

* * * * *